May 28, 1940.  J. A. YUNCK  2,202,327
FROSTED GLASS ARTICLE AND METHOD OF MAKING IT
Filed June 7, 1938
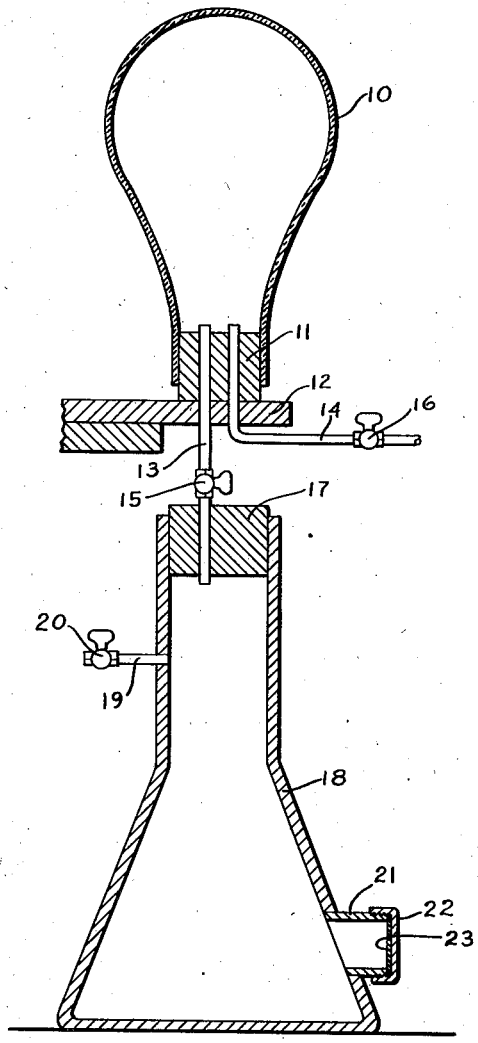
INVENTOR.
JOHN A. YUNCK
BY Dorsey, Cole & Garner
ATTORNEYS.

Patented May 28, 1940

2,202,327

UNITED STATES PATENT OFFICE 2,202,327

FROSTED GLASS ARTICLE AND METHOD OF MAKING IT

John A. Yunck, South Orange, N. J., assignor to Corning Glass Works, Corning, N. Y., a corporation of New York Application June 7, 1938, Serial No. 212,329

6 Claims. (Cl. 41—41)

This invention, which is a continuation in part of my prior application Serial Number 158,841 filed August 13, 1937, relates to the art of frosting glass, and is particularly concerned with the application of light-diffusing frosting to the interior surfaces of electric incandescent lamp envelops and similar articles.

It is now well understood that the frosting by etching of the inside surfaces of electric incandescent lamp bulbs is highly desirable, for the reason that it makes it possible to obtain better light diffusion with lower light absorption. Another advantage of inside frosting is that the outer surface is left smooth, does not collect dirt easily and is easy to clean. Various methods for obtaining such frosting have been proposed, with varying degrees of success. However, such methods are often laborious, and invariably result in the production of bulbs which, unless subsequently fortified, are much more fragile than clear glass bulbs.

Such methods are all characterized by treating the bulbs with liquid etching solutions, usually containing a slurry of undissolved salts or inert materials. These solutions, containing or evolving hydrofluoric acid, exert a corrosive effect on the glass envelope with which they come in contact and produce minute cuts and crevices in the surface of the glass, whereby a permanent, ineradicable matte surface of highly diffusing character is produced. The cuts and crevices weaken the glass considerably and it is necessary to fortify the surface or round out the angles of the crevices by a subsequent treatment with dilute acid in order to maintain the strength of the article.

The object of this invention is to produce simply and easily a dense, white, light-diffusing surface on the interior of incandescent lamp bulbs and the like without any substantial weakening of the article.

The above and other objects may be accomplished by practicing my invention which embodies among its features subjecting the inner surface of the article to the action of a gaseous mixture of hydrogen fluoride and air.

Another feature of the invention is a lamp bulb having on its inner surface a novel type of frost in the form of a superficial, easily removable layer consisting of reaction products of hydrogen fluoride and constituents of the glass.

In order that the invention may more readily be understood, reference is had to the accompanying drawing in which the figure illustrates an apparatus for carrying out the process, it being understood that various other types of apparatus may also be employed.

I have discovered that a very satisfactory white frost coating for incandescent lamp bulbs may very simply and easily be obtained without applying liquid fluoric solutions and without rendering them materially less fragile than they were before treatment. Briefly described, my invention consists in the treatment of the inside of such bulbs with a frosting gas. I have found that when the inner surface of a bulb is treated with vaporous hydrogen fluoride in admixture with a certain amount of atmospheric air, there is deposited on the glass surface a white light-diffusing coating composed of fluorides of glass constituents which is relatively adherent but which may be wiped off or removed with a jet of water leaving the surface of the glass substantially clear and that the strength of the bulb is substantially unimpaired.

In the drawing, a bulb 10 is disposed on a stopper 11 of a size sufficient to fit fairly snugly into the mouth of the bulb. The stopper 11 may be fixed to a stand 12 in order that the bulb may be held steady in proper position.

Extending through the stopper 11 and stand 12 are tubes 13, 14 having stop-cocks 15, 16 arranged therein. Tube 13 is extended through a stopper 17 of a retort 18, while tube 14 is connected to an exhaust pump (not shown) of any desired type.

The retort 18 is preferably constructed of lead or other suitable material resistant to fluorides. It is provided with an opening for a supply line 19, through which air may be drawn into the container at the proper time during the operation of the process, by opening a cock 20. Retort 18 is also provided with an opening adjacent its lower portion, in which a conduit 21 is secured for introducing the chemicals required for the operation of the process. A cover or cap 22 having a gasket 23 is provided to close the end of the conduit.

In practicing the invention a mixture of finely powdered fluorspar and concentrated sulphuric acid, mixed into a fairly thick paste, is charged into the lead retort 18 through the conduit 21, and the cover 22 is closed. The bulb 10 is evacuated by starting the exhaust pump and opening valve 16, and the retort is partially evacuated by slightly opening valve 15. The retort is then gently heated in order to accelerate the double decomposition reaction in which the sulphuric acid acts on the calcium fluoride to produce hydrogen fluoride gas. As soon as the vapors of hydrogen fluoride are evolved, the valve 15 is completely opened, and the valve 20 is partially opened in order to allow a small amount of air to be drawn into the bulb 10. The bulb should be kept relatively cool, that is, about 19° C. or below in order to condense the acid vapors. The vacuum created by the pump is adjusted so that the gases are drawn through and condensed upon the interior surface of the bulb relatively slowly and uniformly, and a uniform frost coating is produced. This coating appears smooth and white and under magnification has a velvety appearance quite different from that of the surface of articles frosted by present methods. Analysis shows that it is composed of a mixture of fluorides of constituents of the glass. Generally, I have found that a treatment of two or three minutes results in a satisfactory coating, but it is advisable to continue the treatment a minute or so longer to obtain optimum benefits. It will be apparent that technical improvements in conditions and equipment will cut down the time of treatment necessary to produce the desired results.

It will be noted that a small amount of air is admitted along with the vapors of hydrogen fluoride. This is accomplished by opening valve 20 slightly in order that the air may be drawn into the system through pipe 19. Apparently, if too much air is admitted, the gaseous mixture is unduly diluted and the effectiveness of the frosting reduced. Although the function of the air is not clearly understood, a certain amount appears to be necessary for the success of the process. The precise quantity required in a given case may readily be determined by trial.

It will be noted that in my process it is unnecessary and undesirable to wash the bulb after frosting because this would remove the superficial coating of fluorides upon which the light-diffusing character of the frosted surface entirely depends. Also for the same reason, it is undesirable to fortify the frosted bulb for the purpose of restoring initial strength and it is unnecessary because my process does not cause any substantial loss of strength and bulbs that have been frosted by my process are substantially as strong as they were prior to frosting. This maintenance of strength is probably due to the fact that the glass surface is not etched as in prior processes but appears clear and visually unchanged when the superficial frost coating is wiped off.

Bulbs that have been frosted by the prior methods have an intricate microscopic pattern of minute angular crevices and projections etched into the surface of the glass and these constitute potential starting points for cracks unless the angles are rounded out by fortification. Their light-diffusing character is due to the reflection of light from the tiny facets of the etch pattern. In the prior methods the frosting solution and reaction products are washed out after the bulb has been frosted and substantially no fluorides nor coating of any kind remains on the glass.

From the above it should now be apparent that my new method will not produce the etch patterns that are characteristic of prior frosted articles and that my frosted bulb cannot be produced by any prior liquid frosting medium.

I claim:

1. The method of producing a light diffusing coating on the interior of a hollow glass article which comprises subjecting the inner surface thereof to the action of a gaseous mixture consisting of hydrogen fluoride and air.

2. The method of producing a light diffusing coating on the interior of a hollow glass article which comprises passing through it a gaseous mixture consisting of hydrogen fluoride and air.

3. The method of producing a light diffusing coating on the interior of a hollow glass article which comprises subjecting the inner surface thereof to the action of a gaseous mixture consisting of hydrogen fluoride and air and condensing the gaseous products on the surface.

4. A hollow glass article having on its inner surface a superficial, anhydrous, light-diffusing coating consisting of reaction products of hydrogen fluoride and the glass the surface of the glass beneath the coating being substantially non-diffusing.

5. A hollow glass article having on its inner surface a superficial, anhydrous, light-diffusing coating consisting of fluorides of constituents of the glass the surface of the glass beneath the coating being substantially non-diffusing.

6. A hollow glass article having on its inner surface a superficial, anhydrous, light-diffusing coating containing fluorides of constituents of the glass, the coating being removable by wiping and the surface of the glass beneath the coating being substantially non-diffusing.

JOHN A. YUNCK.